INVENTOR
HARRY C. FISCHER

BY Birch & Birch
ATTORNEY

Jan. 20, 1970            H. C. FISCHER            3,490,654
CONTROLLED VOLUME SYSTEMS FOR PNEUMATIC DISCHARGE
OF POWDERED AND GRANULAR MATERIALS AND THE LIKE
Filed Jan. 22, 1968            4 Sheets-Sheet 1

INVENTOR

BY
Birch & Birch
ATTORNEY

INVENTOR
HARRY C. FISCHER
Birch & Birch
ATTORNEY

Jan. 20, 1970　　　　H. C. FISCHER　　　　3,490,654
CONTROLLED VOLUME SYSTEMS FOR PNEUMATIC DISCHARGE
OF POWDERED AND GRANULAR MATERIALS AND THE LIKE
Filed Jan. 22, 1968　　　　　　　　　　　　　　　4 Sheets-Sheet 2

INVENTOR
ATTORNEY

Jan. 20, 1970 H. C. FISCHER 3,490,654

CONTROLLED VOLUME SYSTEMS FOR PNEUMATIC DISCHARGE OF POWDERED AND GRANULAR MATERIALS AND THE LIKE

Filed Jan. 22, 1968 4 Sheets-Sheet 3

INVENTOR

HARRY C. FISCHER

BY Birch & Birch

ATTORNEY

INVENTOR
HARRY C. FISCHER
BY
Birch & Birch
ATTORNEY

# United States Patent Office

3,490,654
Patented Jan. 20, 1970

3,490,654
CONTROLLED VOLUME SYSTEMS FOR PNEUMATIC DISCHARGE OF POWDERED AND GRANULAR MATERIALS AND THE LIKE
Harry C. Fischer, Royal Oak, Md. 21662
Filed Jan. 22, 1968, Ser. No. 699,558
Int. Cl. B67d 5/54
U.S. Cl. 222—193                                   23 Claims

ABSTRACT OF THE DISCLOSURE

Systems and apparatus effecting direct delivery of controlled volumes or flow rates of powdered and granular materials and the like from hoppers or reservoirs through tubular conduits or bosses to discharge outlets are provided wherein an individual flow conduit for each discharge outlet is utilized. Each flow conduit is of a predetermined length and diameter effecting a predetermined volume or mass flow of the powdered or granular material asported pneumatically from the reservoir through the said conduits. In some of the embodiments of the invention, variable flow control means are provided which act on the pneumatic pressure source and/or on the flow conduits themselves. Adjustable spreader structures effecting controlled swath delivery from each discharge outlet are also provided.

---

This invention relates to systems and apparatus for pneumatic application of particulate substances and more particularly to systems and apparatus for the controlled volume deposition of powdered and/or granular chemicals and the like to crops, soil and subsoil in either discrete areas or in a broadcast mode of deposition, by pneumatic asportation.

In the past, without the use of relatively complex, cumbersome, and costly equipment, accurate control of the volume or mass flow of powdered and granular pesticides and fertilizers and the like in terms of ounces per minute or pounds per acre (or other unit area) has been a practical impossibility.

Further, uniformity of distribution is another attendant problem in depositing powdered and/or granular materials, particularly where such materials must be deposited in a broadcast mode.

Another attendant disadvantage in prior art equipment of depositing such powdered and/or granular materials over large areas is the bulk and weight of such equipment, resulting in handling difficulties in soft field areas or in insufficient carrying capacity when the bulk and weight of the equipment are reduced.

The present invention obviates the problems of cost, weight, bulk, uniformity of volume or mass flow and uniformity of deposition.

It is an object of the present invention to provide new and novel flow control techniques for powdered and/or granular materials; and further provide new and novel systems and apparatus for effecting same.

Another object of the present invention is to provide new and novel reservoir and pneumatic manifolding apparatus for the controlled deposition of particulate materials.

Still another object of the present invention is to provide new and novel flow metering devices for the controlled deposition of particulate materials by pneumatic asportation.

Still another object of this invention is to provide new and novel pneumatic deposition systems and apparatus for particulate materials utilizing ganged discharge orifices, with each such orifice being fed individually.

Still another object of this invention is to provide new and novel pneumatic deposition systems and apparatus for particulate materials utilizing ganged discharge orifices, with each such orifice being fed individually through a tubular conduit such as plastic tubing or the like having predetermined volume or mass flow rates over a given range of pneumatic pressures.

Still another object of this invention is to provide new and novel flow control means for a plurality of particulate material delivery conduits to a like plurality of discharge orifices to effect uniformity of volume and/or mass flow rates from such orifices.

Still another object of this invention is to provide new and novel flow control means for a plurality of particulate material delivery conduits to a like plurality of discharge orifices to effect uniformity of volume and/or mass flow rates from such orifices; and further to provide new and novel volume and/or mass flow rate calibrating means adapted to be selectively attached to each such orifice.

Yet another object of this invention is to provide new and novel systems and apparatus for the controlled deposition of particulate materials, including new and novel swath control apparatus for both single and ganged discharge orifice systems.

These and other objects of the invention will become more fully apparent with reference to the following specification and drawings, which relate to several preferred embodiments of the present invention.

THE SYSTEMS AND BASIC APPARATUS

Figure 1:
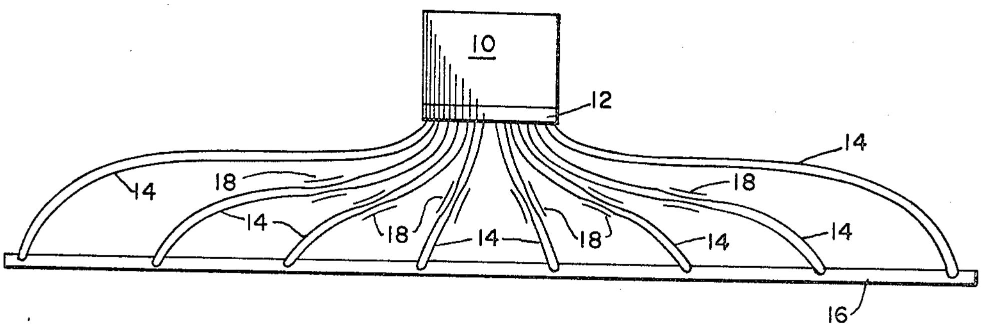
FIGURE 1 is a schematic of a first embodiment of the invention illustrating a ganged discharge system for the deposition of particulate materials.

Referring in detail to the drawings, and more particularly to FIGURE 1, the present invention is shown as basically including a particulate material reservoir 10, a tube manifold 12 on the lower extremity of said reservoir 10, a plurality of metering tubes 14 extending from the manifold 12 to a discharge boom 16 and a flow control restrictor means 18 on selected ones of said metering tubes 14.

Figure 2:
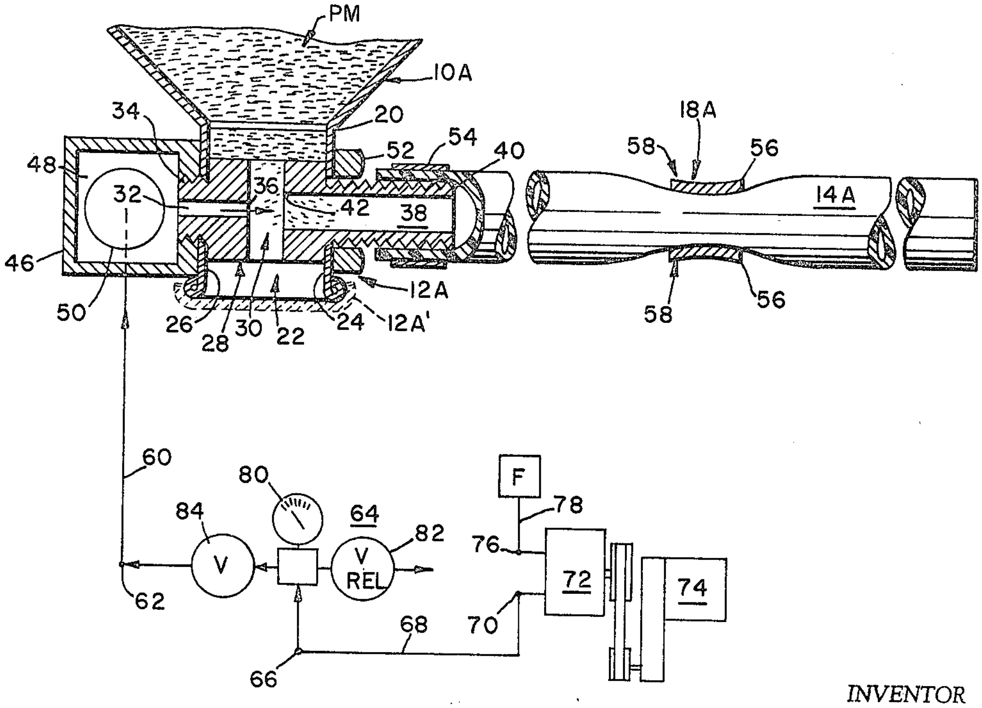
FIGURE 2 is a cross-sectional detail of an apparatus including pneumatic supply means, particulate material reservoir and metering tube in a particulate material deposition system shown partially in schematic form therein.

Referring now to FIGURE 2, wherein like parts to the embodiment of FIGURE 1 bear like numerals with the suffix A, the reservoir 10A is shown as a gravity feed hopper having a restricted lower outlet portion 20, communicating with the internal cavity 22 defined between the front and rear wall portions 24 and 26, respectively, of the metering tube manifold 12A.

The tube manifold 12A further includes, for each metering tube 14A, a venturi means 28 having a vertical feed bore 30 extending therethrough in the internal cavity 22; a horizontal air intake port 32 extending through an integral threaded inlet fitting 34, through the back wall 26 of the manifold 12A and intersecting the vertical bore 30 at right angles, with a substantially sharp or abrupt intake bore periphery 36; and a horizontal outlet bore 38, extending through an integral tube fitting 40, through the front wall 24 of the tube manifold 12A and intersecting the vertical feed bore 30 at right angle with a substantially sharp or abrupt outlet bore periphery 42.

The outlet bore 38 is coaxially aligned with the air intake port 32 across the vertical feed bore 30, and is of a larger diameter (or cross-sectional area) than the said air intake port 32. In the case of the circular bores; shown, the diameter of the outlet bore may be, for example, three (3) times that of the air intake port 32.

Particulate material PM is shown in the hopper or reservoir 10A and descends therefrom, by gravity, into the vertical feed bore 30 of each venturi assembly 28 in the tube manifold 12A.

The vertical feed bore 30 is at least as large in diameter and preferably of a larger diameter than the outlet bore 38, to permit relatively free gravity flow therein of the particulate material PM out of the reservoir 10A.

A pneumatic supply manifold 46, shown as a hollow rectangular body in cross-section, is provided across the length of the rear wall 26 of the tube manifold 12A, with its internal cavity 48 being in common communication with all of the air intake ports 32 in the intake fittings 34. A common air supply port 50 is provided in one end of the pneumatic supply manifold 46.

An annular boss 52 is provided on the outlet fitting 40 of the venturi assembly 28 in juxtaposition with the front wall 24 of the tube manifold 12A.

Each outlet fitting 40 is adapted to telescopically receive, in an externally concentric relationship, a metering tube 14A which is held in place by a suitable tube or hose clamp 54.

As shown in FIGURE 2, each metering tube 14A is preferably a flexible, relatively thick walled, constant internal diameter tubing of a material such as polyethylene. Further, such tubes 14A are preferably transparent or transluscent so that obstructions therein can be readily detected in the practice of the invention.

The flow control restrictors 18A are comprised of arcuate, relatively rigid, opposed plates 56 which overly a substantial length of the metering tube 14A to preclude the formation of abrupt restrictions in the said tubes 14A when the said plates 56 are moved to constrict the tube 14A in the direction indicated by the arrows 58.

The pneumatic supply manifold 46 is connected at its air supply inlet 50 to one end of an air supply line 60, the latter being connected at its other end to a regulated pressure air outlet 62 of a quick acting valve manifold 64.

The valve manifold 64 is supplied at its pressure inlet 66 through a second air supply line 68 from the output 70 compressor assembly 72, the latter being driven by a suitable power takeoff 74 or the like. The inlet 76 of the compressor 72 is connected to atmosphere through an intake line 78 and air filter F.

The valve manifold 64 comprises a pressure gauge 80, a pressure regulator 82 and a quick-acting valve means 84, the latter being in-line between the valve manifold inlet 66 and outlet 62.

Figure 3:
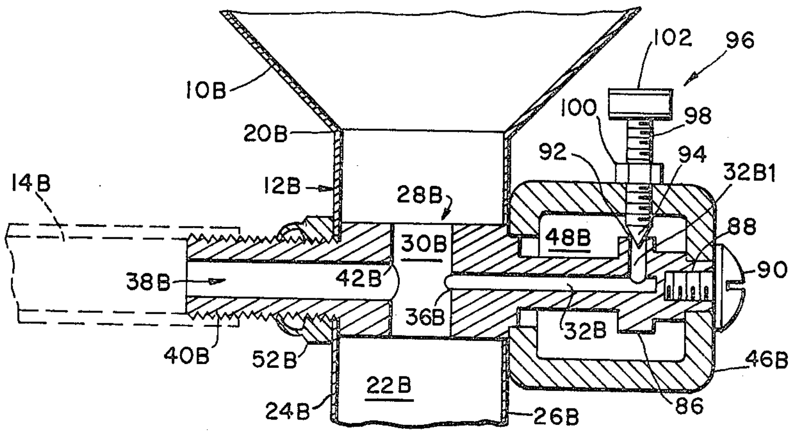
FIGURE 3 is another embodiment of pneumatic asportation and reservoir means, shown in cross-section, for the particulate material deposition systems of the present invention.

Referring now to FIGURE 3, another embodiment of the venturi assembly 28B will be described with like parts to FIGURES 1 and 2 bearing like numerals with the suffix B.

In this embodiment, the intake bore 32B is a blind-bore in an elongated intake fitting 86 which extends completely through the internal cavity 48B of the pneumatic supply manifold 46B to a point adjacent blind, threaded, opposed bore 88, adapted to receive a hold-down screw 90 through a wall of the supply manifold 46B to secure the venturi assembly 28B in the tube manifold 28A against the complementary retaining action of the annular boss 52B on the outlet fitting 40B.

A vertical, intersecting control bore 32B1 extends from the internal cavity 48B of the supply manifold 46B, through the intake fitting 86 into communication with the intake bore 32B. The open end of the control bore 32B1 is always disposed above the intake bore 32B and comprises an annular valve seat 92 for the conical valve head 94 of a needle valve assembly 96.

The needle valve assembly 96 comprises a threaded valve stem 98 extending through a threaded bushing 100 or the like in an upper wall portion of the supply manifold 46B and carries a knurled knob 102 externally of the supply manifold 46B to permit selective adjustment of the valve head 94 with respect to the valve seat.

The use of a blind intake bore 32B and the vertical control bore 32B1 prevents feed-back of granular material into the supply manifold 46B from the tube manifold 12B.

Further, the needle valve assembly 96 provides individual pressure flow regulation for each of the venturi assemblies 28B, whereby selective flow rate adjustments in each of the metering tubes 14B (14, 14A).

The venturi assembly 28B may be interchanged with the venturi assembly 28 in any of the embodiments of the invention described or to be described herein.

Figures 6, 7A, 7B, 7C:
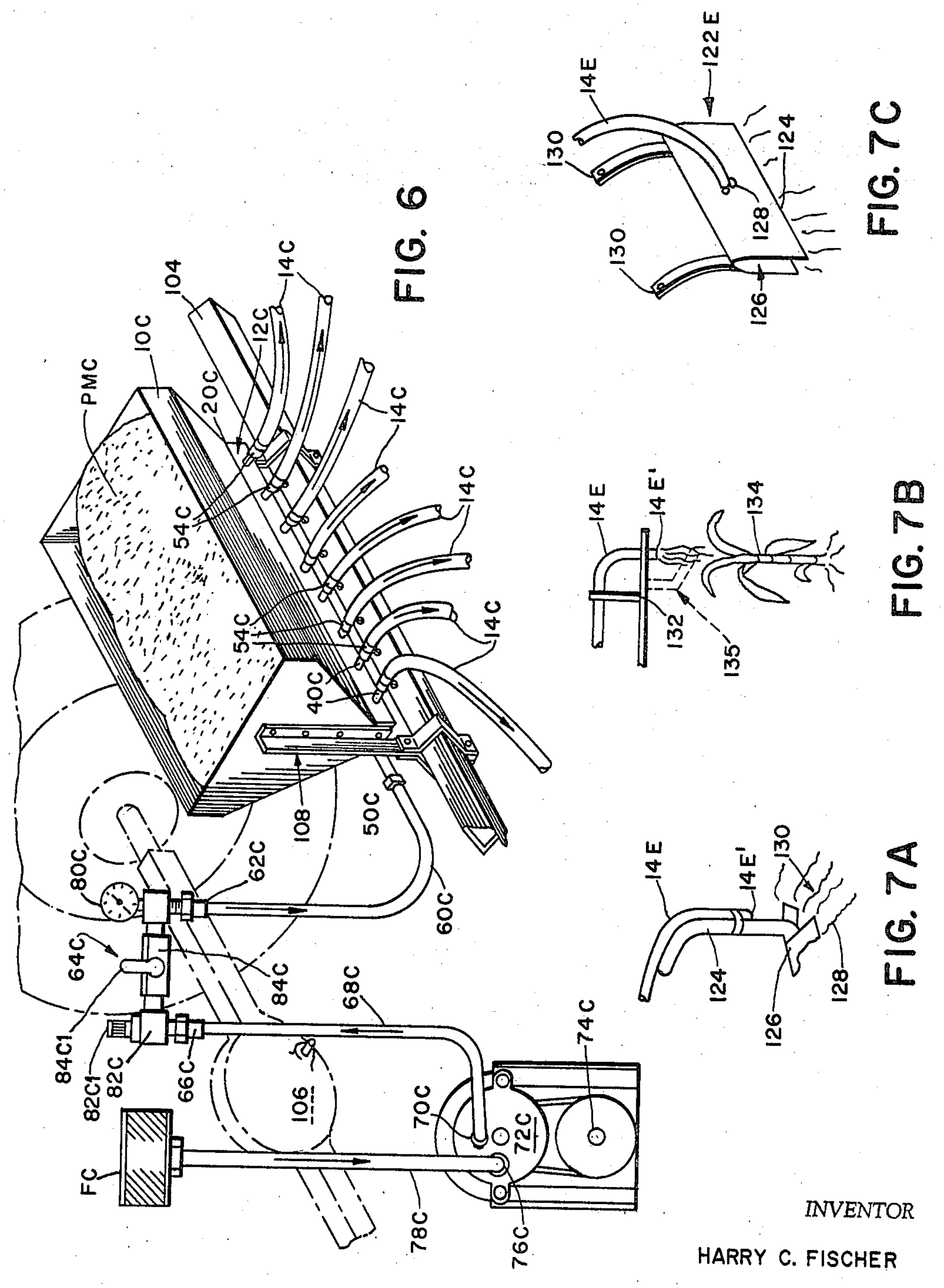
FIGURE 6 is a detail of a physical embodiment of the pneumatic supply, particulate material reservoir and metering tube manifolding structure of a particulate material deposition system of the present invention.
FIGURE 7A is a perspective of a subterranean deposition device of the present invention.
FIGURE 7B is a perspective of a discharge device of the present invention for applying particulate materials directly to crops.
FIGURE 7C is a single swath deposition device of the present invention.

Referring now to FIGURE 6, a general physical embodiment of the elements of FIGURES 1, 2 and 3 is shown, with like parts being identified by like numerals with the suffix C.

A reservoir 10C of particulate material PMC is shown fixed to a mounting bar or bracket 104 of a tractor or other vehicle schematically shown in phantom lines as a wheel and axle assembly 106. A bracket and clamp assembly 108 is provided at each end of the reservoir 10C to secure the latter to the mounting bar 104.

The tube manifold 12C is shown with a plurality of outlet fittings 40C extending therefrom with a metering tube 14C mounted on each by means of a hose clamp 54C.

As will later be described with refetrence to FIGURES 4, 5, 7, 8 and 9, the outer ends of the metering tubes 14C comprise the discharge orifices for the granular material PMC in the hopper or reservoir 10C.

Figures 8, 9:
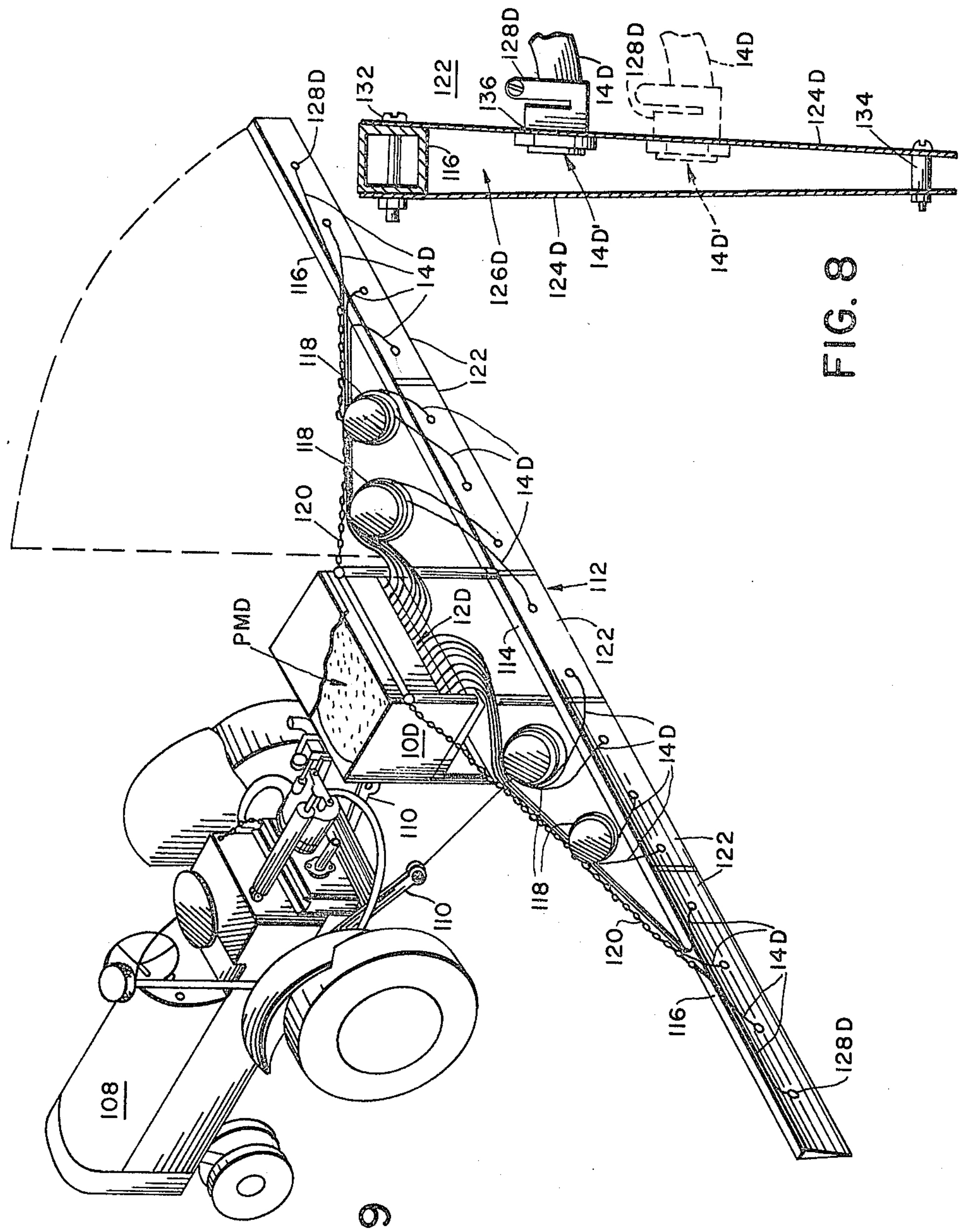
FIGURE 8 is a cross-sectional detail of the swath deposition device of FIGURE 7C.
FIGURE 9 is a perspective of a ganged deposition system of the present invention for the broadcast mode of deposition.

Referring next to FIGURE 9, another physical embodiment of the systems of FIGURES 1, 2 and 3 is shown with like parts thereto (and to FIG. 6) bearing like numerals with the suffix D.

A tractor 108 is shown with draft bars 110 adapted to carry a particulate material deposition boom assembly 112, the latter including, if desired a center section 114 and folding end sections 116 on either side thereof.

A material reservoir 10D including particulate material PMD is mounted on the boom assembly 112 and a plurality of metering tubes 14D are extended from the tube manifold 12D thereof.

All of the metering tubes 14D are of an equal predetermined length with all of the excess lengths of the more inboard tubes 14D being faked into coils 118 or the like suspended from the truss chains 120 or other support members of the boom assembly 112.

The tubes 14D terminate in spreader hoods 122 which are in an end-to-end relationship along the boom assembly 112. The spreader hoods 122 will be hereinafter more fully described with reference to FIGURES 7C and 8.

THE DISCHARGE MODES

Many modes of particulate material discharge to effect selected types of deposits are possible with the present invention. Several illustrative examples of such discharge modes will now be described.

Referring first to FIGURE 7A, a subterranean discharge mode is shown, in which a metering tube 14E (14–14D) is affixed to the rear of an upstanding shaft 124 of a gang plow or harrow blade 126 or the like.

The blade 126 travels beneath the surface of the soil 128 effecting a furrow 130. The metering tube 14E has its discharge end 14E' directed downwardly along the blade shaft 124 such that any particulate material discharged therefrom will enter the furrow 130 immediately behind the blade 126.

Thus, seeding, fertilizing and/or deposition of pesticide for each furrow 130, either singly or in gang operations, is readily effected by the present invention.

Referring next to FIGURE 7B, a topical discharge mode for direct deposition of particulate material onto row crops such as corn is shown, in which the metering tube 14E (14–14D) is mounted on a boom or tool arm 132, the latter being elevated to pass over the corn plants 134 or the like. The metering tube discharge end 14E' is directed down towards the plants 134 to effect direct deposition thereon of discharged particulate material.

Baffles or spreaders of various types, schematically illustrated at 135, may be utilized with the embodiment of FIGURE 7B to effect greater or lesser concentrations of particulate material per unit area of ground surface beneath the boom 132.

A spreader 122 with a selectively variable swath (see FIG. 9, spreader sections 122) will now be described with reference to FIGS. 7C, 8 and 9.

A single spreader section 122E is shown in FIG. 7C as a substantially U-shaped plate 124 having an internal cavity 126. A metering tube 14E (14–14D) is connected with the internal cavity 126 through the plate 124 where it is held by a cable or hose clamp 128.

The spreader section 122E in this embodiment is adapted to be mounted on a tool bar or the like (not shown) by means of suspension brackets or straps 130.

The individual spreader sections 122 of FIG. 9, are shown in cross-section in FIG. 8 as comprising a U-shaped plate 124D (or a pair of plates 124D) suspended over the boom 116, which acts as a spacer member, defining the upper dimension of the internal cavity 126D. and/or secured thereto by a retaining bolt 132.

The lower ends of the plates 124D are connected by other spacer means 134 such that the lower (open) edges of the said plates 124D are convergent.

The metering tubes 14D have their discharge ends 14D' in communication with the internal cavity 126D of the spreader section 122 through ports 136 in the plates 124D wherein they are remained by means of cable or hose clamps 128D.

In operation of the spreaders 122, the vertical position of the metering tubes 14D in the plates 124D determines the width of the swath of particulate material broadcast by the spreader 122.

For example, in the solid line position shown in FIG. 8, each metering tube 14D will effect a relatively narrow swath emission of particulate material from the spreader 122.

The dotted line position (lower), however, will cause each metering tube to effect a relatively wide swath emission of particulate material from the spreader 122.

Therefore, the width of swath of particulate material emitted from the spreader 122 is inversely proportional to the height of the metering tube ends 14D' above the lower edges of the plates 124D.

As shown, the metering tube ends 14D' discharge directly against one of the plates 124D across the internal cavity 126D of the spreader 122.

METERING TUBE FLOW CALIBRATION

In any of the foregoing embodiments, the flow rate of particulate material through the longest of the metering tubes 14–14E is the first to be set to a desired standard, such as, for example, two (2) ounces per minute of particulate material per metering tube.

Figure 4:
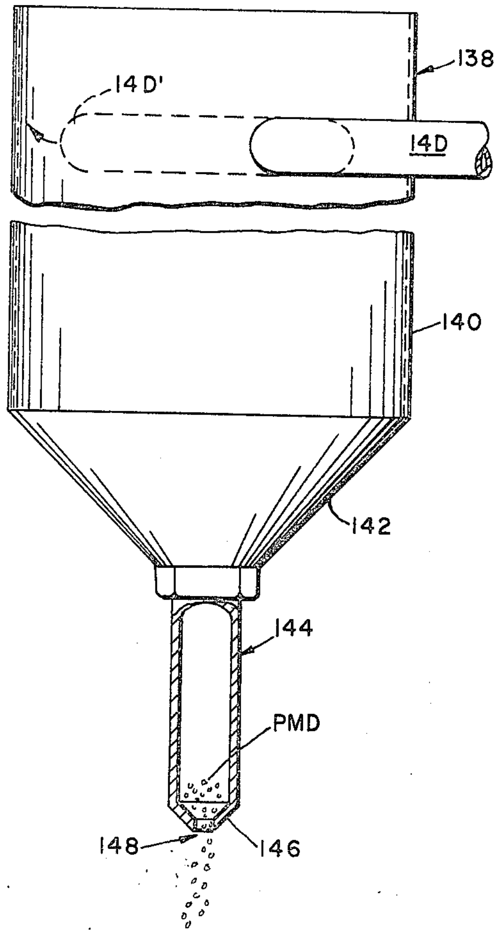
FIGURE 4 is a side elevation of a cyclone tank flow calibration device of the present invention.
Figure 5:
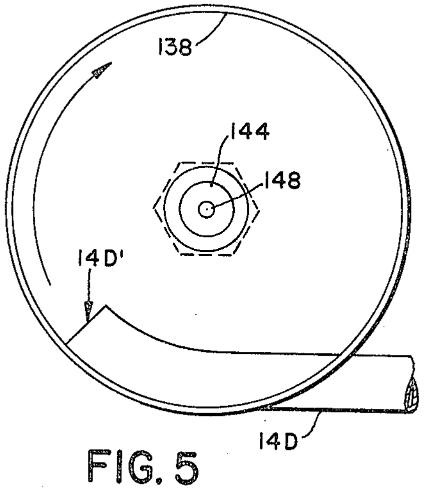
FIGURE 5 is a top plan view of the device shown in FIGURE 4.

Referring to FIGURES 4 and 5, wherein the metering tube 14D and its discharge end 14D' are labelled identically as in FIGURES 8 and 9, for purposes of calibration, and assuming a flow of particulate material through the metering tube 14D, the discharge end 14D' thereof is tangentially inserted into the upper end of a cyclone tank 138.

The cyclone tank 138 comprises a cylindrical upper section 140 and a conical lower section 142 which funnels into a dependent, transparent sight-glass 144 having an inverted frusto-conical lower tip 146 with a calibrated flow orifice 148 therein.

The flow rate in the metering tube 14D is then varied, as will be hereinafter more fully described, until the visible level of particulate material PMD is maintained at a constant height above the calibrated orifice 148. This condition indicates that the particulate material flow rate for which the orifice 148 is calibrated is being delivered by the metering tube 14D to the cyclone tank 138.

As will be readily understood by those of ordinary skill in the art, the calibration of the orifice 148 is for a given particle size of particulate material for a particular desired flow rate.

Once the flow rate for the longest of the metering tubes 14D in a gang assembly has been established, then all of the shorter tubes 14D can be readily calibrated by use of the flow restrictors 18–18A (FIGS. 1 and 2) and/or the pressure regulator valves 82, 82C (FIGS. 2 and 6) and/or the needle valve assembly 96 (FIG. 3).

It is to be expressly understood that all of the pressure and/or flow control devices are selectively interchangeable or usable in all of the systems embodiments of the present invention.

OPERATION

Referring first to the embodiments of FIGURES 1, 2 and 6, and assuming the presence of air pressure at the output 70 (70C) of the compressor 72 (72C), which for optimum performance must provide a source of dry (oil free) air, the quick acting valve 84 (84C) is thrown open and air is admitted to the supply manifold 46 through the pressure line 68 (68C), valve manifold input 66 (66C), valve manifold 64 (64C) and its outlet 62 (62C), pressure line 60 (60C) and supply port 50 (50C) into the supply manifold cavity 48.

This results in a high velocity stream of air through the intake ports 32 of the venturi assembly 28 which agitates and asports the particulate material PM (PMC) in the vertical feed bore 30 (and the reservoir 10A, 10C) through the outlet ports 38 and into and through the metering tubes 14 (14A, 14C).

The metering tubes 14 (14A, 14C) have a predetermined internal diameter which, depending upon the length of the said tubes 14 (14A, 14C) effects a predetermined flow rate (such as ounces per minute of particulate material) through the said tubes 14 (14A, 14C) in a substantially similar manner as a capillary tube controls fluid flow therethrough.

Thus, the outboard (longest) metering tubes 14, 14C of FIGS. 1 and 6 have the lowest unrestricted flow rate for a given supply pressures in the supply manifold 46 (shown in FIG. 2).

To balance the flow in the metering tubes 14 (14A, 14C) the flow restrictors 18 (18A) are adjusted to selectively impede flow in each of the inboard tubes 14 (14A) by use of the previously described calibrating device of FIGS. 4 and 5, each of the metering tubes 14 being temporarily disconnected (in turn) from the boom 16 and connected with the cyclone tank 138 (FIGS. 4 and 5).

The sharp edges 36 and 42 of the intake and outlet bores 32 and 38, respectively, at the feed bore 35 in the venturi assembly 28, prevent wedging action between the particles of the particulate material PM and create collisions therebetween to effect optimum agitation of the said material PM. Therefore, substantially continuous gravity feed of the particulate material PM into the inner cavity 22 of the tube manifold 12 (12A, 12C) is effected and stoppage in the venturi assembly 28 is precluded.

Although the tank 10A in FIG. 2 is shown as open at the lower end of the tube manifold 12A, a slide or flap valve or the like, schematically shown at 12A′, may be placed over the lower end of the tube manifold 12A to prevent gravity spill of the particulate material PM.

Referring now to FIGURE 3, and assuming that air pressure is present in the internal cavity 48B of the manifold 46B, and that the venturi assembly 28B is present in the embodiments of FIGS. 6 and 9, the operation of the said venturi assembly 28B and its associated needle valve assembly 96 is as follows:

The needle valve assembly 96 may be initially closed (valve head 94 engaged with valve seat 92) on each of the venturi assemblies 28B, arranged one for each of the metering tubes 14C, 14D.

The most outboard of the tubes 14C, 14D is attached to a cyclone tank 138 (FIG. 5) and the adjusting knob 102 on the valve stem 98 of the needle valve assembly 96 is actuated to adjust the flow of particulate material PMC, PMD through the said metering tubes 14C, 14D to stabilize the level of the particulate material (PMD of FIG. 5) in the transparent sight tube 144 above the calibrated orifice 148.

Once this has been accomplished for the outboard (longest) metering tubes 14C, 14D, which have the least natural flow rate due to the capillary type flow control action thereof, the inboard metering tubes can be individually calibrated by adjusting their respectively associated needle valve assemblies 96 in the respective venturi assemblies 28B, to effect a pressure reduction in the intake ports 32B thereof directly proportional to the difference in length of the respective inboard tubes from the outboard tubes.

The cyclone tank 138 and sight-glass 144 are used with each metering tubes 14C, 14D to rapidly calibrate the flow from ecah and effect complete uniformity of discharge of particulate material in ganged configurations.

Referring additionally to FIGURES 8 and 9, the metering tubes 14D effect substantially equal flow rates since they are of equal length and diameter. Thus, the needle valve assemblies 96 associated therewith are substantially pre-adjusted at similar settings thereof. Thus, the embodiment of FIGURE 9 provides a more expedient system from the standpoint of initial calibration of the flow rates in the individual metering tubes 14D.

As can be readily seen from the foregoing description of FIGURE 8, the spreader sections 122, when ganged on a single boom 116 such as shown in the embodiment of FIGURE 9, selectively provide wide single swath distribution or controlled parallel swath distribution by selective variations of the height of the discharge ends 14D′ of the metering tubes 14D in the plates 124D of the spreader assembly 122.

As can readily be seen from the foregoing specification and drawings, the present invention provides new and novel systems and apparatus for pneumatically asporting particulate materials from a reservoir to a desired point of discharge and thereafter controlling the pattern of the discharge to effect controlled deposition of the said particulate material on the ground surface, on crops, below the ground surface or in other selected modes of application.

The systems include a quick-acting valve controlling the pneumatic supply to effect a sudden influx of pressure into the venturi assemblies 28, 28B to assure sufficient initial turbulence in the vertical feed tubes 30, 30B to effect asportation of the granular material PM, PMC therefrom into the metering tubes 14A, 14B (14, 14C, 14D, 14E).

The rate of flow of particulate material is selectively adjustable through each of the metering tubes in all of the foregoing embodiments of the present invention. Thus a wide variation of prescribed densities of particulate material on or below a ground surface or on crops to provide the proper pest control, fertilization, or the like.

The new and novel manifolding and venturi structures of the present invention in combination with the new and novel metering tubes, make such versatility and control possible.

In addition, the new and novel cyclone tank and sight-glass calibrating means for the flow rates in each of the metering tubes provides the means for expeditiously and accurately balancing the discharge of particulate material in gang operations.

Further, the new and novel variable swath spreader structures of the present invention provide optimum uniformity of distribution of the discharged particulate material over wide areas of ground surface.

Thus, the present invention satisfies a long felt need in the art for simple, accurately and readily controllable particulate material deposition systems and apparatus of a versatility heretofore unattainable in the art.

While only several specific embodiments are hereinbefore illustrated and described, it is to be expressly understood that this invention is not intended to be limited to the exact formations, construction or arrangement of parts as illustrated and described because various modifications may be developed in putting the invention to practice within the scope of the appended claims.

What is claimed is:

1. For use in particulate material asportation and discharge systems, said systems including a gravity feed material reservoir and a supply of pneumatic pressure; material flow rate control means comprising manifold means adapted to be connected to a source of pneumatic pressure; venturi means comprising substantially horizontally-oriented intake port means, substantially vertically-oriented feed port means transversely interconnected with said intake port means, and outlet port means coaxially aligned with said intake port means across said feed port means and transversely interconnected with the latter; and metering tube means interconnected with said outlet port means; said metering tube means being characterized by predetermined flow rate characteristics; said feed port means of said venturi means being adapted to receive a continuous flow of particulate material from a gravity flow reservoir means and comprising a substantially abruptly defined and uniform bore; and wherein, in said venturi means, said intake port means and said outlet port means have abruptly defined intersections with said feed port; and wherein said feed port means and said outlet port means are of substantially greater internal diameter than said intake port means.

2. The invention defined in claim 1, wherein said metering tube means comprises at least one tubular conduit of a predetermined length and internal diameter thereby effecting said predetermined flow rate characteristic thereof.

3. The invention defined in claim 1, wherein said venturi means further includes variable flow control means effecting selectively variable pressure flow in said intake port means from said manifold means.

4. The invention defined in claim 1, wherein said venturi means further includes variable flow control means effecting selectively variable pressure flow in said intake port means from said manifold means, said variable flow control means comprising a branch port means interconnecting said intake port means and said manifold means and needle valve means in said branch port means.

5. The invention defined in claim 4, wheerin said branch port means is substantially vertically disposed and said needle valve means is positioned above said intake port means.

6. The invention defined in claim 1, wherein said metering tube means comprises a plurality of tubular conduits of substantially identical length and internal diameter effecting substantially identical rates of flow of air-asported particulate material therethrough for a given value of supply pressure.

7. Particulate material handling means comprising gravity feed reservoir means adapted to contain particulate material; first manifold means on said reservoir adapted to receive particulate material therefrom; a source of pneumatic supply pressure; second manifold means adjacent said first manifold means; valve means selectively interconnecting said source and said second manifold means; venturi means in said first manifold means including first port means interconnecting said first and second manifold means, second port means adapted to receive particulate material from said reservoir means and third port means adapted to discharge air-asported particulate material from said first manifold means; and metering tube means interconnected at one end with said third port means at said first manifold means, the other end thereof comprising particulate material discharge means; wherein said first and third port means are substantially horizontally disposed and coaxially aligned and said second port means is a substantially vertically disposed, uniform, abruptly defined bore transversely interconnected on opposite sides thereof with said first and third port means and forming substantially abrupt intersections therewith; and wherein said second and third port means are of substantially greater internal diameter than said first port means.

8. The invention defined in claim 7, wherein said metering tube means comprises at least one flexible tubular conduit of predetermined length and internal diameter effecting a predetermined flow rate of air asported particulate material therethrough for a given supply pressure from said source, said tubular conduit effecting a directly proportional change in said flow rate in response to a change in said supply pressure.

9. The invention defined in claim 7, wherein said valve means is of the quick-acting type, effecting a sudden coupling of said supply pressure to said second manifold means.

10. The invention defined in claim 7, wherein said venturi means further includes variable flow control means effecting selectively variable pressure flow in said first port means from said second manifold means.

11. The invention defined in claim 7, wherein said venturi means further includes variable flow control means effecting selectively variable pressure flow in said first port means from said second manifold means, said variable flow control means comprising a fourth port means interconnecting said first port means and said second manifold means and needle valve means in said fourth port means.

12. The invention defined in claim 11, wherein said fourth port means is substantially vertically disposed and said needle valve means is positioned above said first port means.

13. The invention defined in claim 7, wherein said metering tube means comprises at least one flexible tubular conduit of predetermined length and internal diameter effecting a predetermined flow rate of air asported particulate material therethrough for a given supply pressure from said source, said tubular conduit effecting a directly proportional change in said flow rate in response to a change in said supply pressure; and wherein said valve means is of the quick-acting type, effecting a sudden coupling of said supply pressure to said second manifold means.

14. The invention defined in claim 7, wherein said metering tube means comprises at least one flexible tubular conduit of predetermined length and internal diameter effecting a predetermined flow rate of air asported particulate material therethrough for a given supply pressure from said source, said tubular conduit effecting a directly proportional change in said flow rate in response to a change in said supply pressure; and wherein said venturi means further includes variable flow control means effecting selectively variable pressure flow in said first port means from said second manifold means.

15. The invention defined in claim 14, wherein said variable flow control means comprises a fourth port means interconnecting said first port means and said second manifold means and needle valve means in said fourth port means.

16. The invention defined in claim 15, wherein said fourth port means is substantially vertically disposed and said needle valve means is positioned above said first port means.

17. The invention defined in claim 7, wherein said handling means further includes variable restrictor means on said metering tube means, selectively constricting said metering tube means to vary the said flow rate characteristic thereof.

18. The invention defined in claim 7, wherein said metering tube means comprises a plurality of tubular conduits of substantially identical flow rate characteristics.

19. The invention defined in claim 7, wherein said metering tube means comprises a plurality of tubular conduits of substantially identical length and internal diameter effecting substantially identical rates of flow of air-asported particulate material therethrough for a given value of supply pressure in said second manifold means.

20. For use in particulate material handling systems, including a source of pneumatic pressure and a reservoir of particulate material, a venturi means adapted to entrain particulate material in a stream of air comprising a body including substantially horizontally disposed, coaxially aligned inlet and outlet port means, and a substantially vertically disposed feed port means comprising a substantially uniform and abruptly defined bore in said body separating and transversely intersecting with said inlet and outlet port means, said inlet and outlet port means having substantially abrupt intersections with said feed port means, said inlet port means being adapted to inject a stream of pressurized air into said feed port means, said feed port means being adapted to receive a continuous gravity flow of particulate material, and said outlet port means being adapted to receive a stream of air-entrained particulate material from said feed port means; and wherein said outlet port means and said feed port means are of substantially greater diameter than said inlet port means.

21. The invention defined in claim 20, wherein said venturi means further includes variable flow control means in said inlet port means.

22. Particulate material handling means comprising gravity fed reservoir means adapted to contain particulate material; first manifold means on said reservoir adapted to receive particulate material therefrom; a source of pneumatic supply pressure; second manifold means adjacent said first manifold means; valve means selectively interconnecting said source and scaid second manifold means; venturi means in said first manifold means including first port means interconnecting said first and second manifold means, second port means adapted to receive particulate material from said reservoir means and third port means adapted to discharge air-asported particulate material from said first manifold means; and metering tube means interconnected at one end with said third port means at said first manifold means, the other end thereof comprising particulate material discharge; mounting means maintaining said other end of said metering tube means in predetermined position with respect to a surface adapted to receive a discharge of particulate material therefrom; and discharge pattern control means on said mounting means adjacent said other end of said metering tube means; said discharge pattern control means comprising first and second opposed, substantially vertically disposed, spaced plate means, and retaining means on one of said plate means receiving said other end of said metering tube means at selectively variable vertical positions thereon and directing said metering tube means, such that air-asported particulate material discharged therefrom is substantially immediately blasted against said other of said plate means to effect a variable swath gravity discharge pattern of particulate material on an adjacent surface as a function of the vertical position of said other end of said metering tube means on said one of said plate means.

23. The invention defined in claim 22, wherein said first and second plate means are oriented to converge from the upper to the lower limits thereof.

References Cited

UNITED STATES PATENTS

| | | | |
|---|---|---|---|
| 1,165,331 | 12/1915 | Gray | 239—654 |
| 1,282,697 | 10/1918 | Johnson | 302—28 X |
| 1,462,861 | 7/1923 | Jordan | 222—193 X |
| 1,636,331 | 7/1927 | Smith | 222—193 |
| 2,059,950 | 11/1936 | Johnson | 239—654 X |
| 2,538,756 | 1/1951 | Braswell | 239—654 X |
| 2,554,432 | 5/1951 | Walters | 222—193 X |
| 2,683,327 | 7/1954 | Hagens | 239—654 X |
| 2,879,923 | 3/1959 | Boatright et al. | 222—193 |
| 2,889,856 | 6/1959 | Magnuson | 302—28 |
| 3,202,320 | 10/1965 | Patton | 222—193 |
| 3,237,805 | 3/1966 | Stogner | 222—193 |

ROBERT B. REEVES, Primary Examiner

H. S. LANE, Assistant Examiner

U.S. Cl. X.R.

222—330; 239—565; 302—28